US007818226B2

(12) United States Patent
Brawley et al.

(10) Patent No.: US 7,818,226 B2
(45) Date of Patent: Oct. 19, 2010

(54) METHOD, SYSTEM AND PROGRAM PRODUCT SUPPORTING INSURANCE-FUNDED END-OF-LIFETIME ACTIVITIES FOR A FACILITY (75) Inventors: Daniel G. Brawley, Panhandle, TX (US); Michael S. Carmody, 5837 Petersburg La., Brentwood, TN (US) 37027; Oscar T. Scott, IV, Amarillo, TX (US); Jeffrey S. Willard, Amarillo, TX (US)

(73) Assignee: Michael S. Carmody, Brentwood, TN (US)

( * ) Notice: Subject to any disclaimer, the term of this patent is extended or adjusted under 35 U.S.C. 154(b) by 1540 days.

(21) Appl. No.: 11/142,212

(22) Filed: Jun. 1, 2005

(65) Prior Publication Data
US 2005/0278200 A1 Dec. 15, 2005

Related U.S. Application Data (60) Provisional application No. 60/579,350, filed on Jun. 14, 2004.

(51) Int. Cl.
G06Q 40/00 (2006.01)

(52) U.S. Cl. .................................................. 705/35
(58) Field of Classification Search ................ 705/4, 705/35
See application file for complete search history.

(56) References Cited

U.S. PATENT DOCUMENTS

| 4,642,768 | A | 2/1987 | Roberts |
| 4,722,055 | A | 1/1988 | Roberts |
| 4,766,539 | A | 8/1988 | Fox |
| 4,839,804 | A | 6/1989 | Roberts et al. |
| 5,202,827 | A | 4/1993 | Sober |
| 5,873,066 | A | 2/1999 | Underwood et al. |
| 6,772,128 | B2 | 8/2004 | Radigan |
| 2002/0062231 | A1 | 5/2002 | Zaccaria et al. |
| 2002/0156658 | A1 | 10/2002 | Selesny et al. |
| 2003/0033171 | A1 | 2/2003 | Radigan |
| 2003/0105651 | A1* | 6/2003 | Gendelman ................ 705/4 |
| 2004/0088202 | A1 | 5/2004 | Radigan |
| 2004/0093231 | A1* | 5/2004 | Walz ........................ 705/1 |
| 2004/0103012 | A1* | 5/2004 | Nussbaum et al. .......... 705/4 |
| 2004/0230460 | A1 | 11/2004 | Thomas et al. |
| 2005/0060207 | A1 | 3/2005 | Weidner et al. |
| 2005/0086084 | A1 | 4/2005 | Dillard |
| 2005/0119919 | A1 | 6/2005 | Eder |

FOREIGN PATENT DOCUMENTS

WO WO 0197127 A1 * 12/2001

OTHER PUBLICATIONS

Alex Russell; Suzanne G. M. Fifield; "An Analysis of Recent Developments in the Regulation of UK Oil and Gas Companies," Petroleum Accounting and Financial Management Journal, Spring 2000, vol. 19, Iss. 1, p. 13.*

"Obstacle to Seabrook Lifted," The New York Times, Mar. 21, 1989, p. D19.*

(Continued)

Primary Examiner—Charles R Kyle
Assistant Examiner—David L Wood
(74) Attorney, Agent, or Firm—Brian F. Russell; Dillon & Yudell LLP (57) ABSTRACT An insurance policy funds end-of-lifetime activities for a non-human facility at an end of a lifetime of the facility with a policy benefit whose amount is based upon growth of a premium.

37 Claims, 5 Drawing Sheets

OTHER PUBLICATIONS

Jerry Mahoney, "Plugging Inactive Oil Wells," Austin American Statesman, Austin, TX, Dec. 7, 2000, p. C1.*

Tom Harrison, "NEIL Wants to Sell Decommissioning Insurance," Platts Inside NRC, Apr. 19, 2004, vol. 26, No. 8, p. 1.*

Barry D. Solomon, "US Nuclear Energy Policy," Energy Policy, Jun. 1982, vol. 10, Iss. 2, p. 109.*

Steven Lipin, "Fixed Income: The Glow of Nuclear Decommissioning," Institutional Investor, New York, Feb. 1988, vol. 22, Iss. 2, p. 131.*

Len Wells, "Illinois First Money to Fund Plugging Wells," Evansville Courier & Press, Evansville, IN, Nov. 14, 2000, p. B1.*

Kathleen Myler, "Have it your way/Funeral prepayment plans make you the conductor of your services," Houston Chronicle, Houston, TX, Jan. 19, 1988, p. 1.*

"Making it easier for you and others; Families find ease and comfort in pre-planning," Telegraph-Journal, Saint John, N.B., Mar. 13, 2004.*

* cited by examiner

METHOD, SYSTEM AND PROGRAM PRODUCT SUPPORTING INSURANCE-FUNDED END-OF-LIFETIME ACTIVITIES FOR A FACILITY

PRIORITY CLAIM

The present application claims priority to U.S. Provisional Application No. 60/579,350, filed on Jun. 14, 2004, which is incorporated herein by reference in its entirety.

BACKGROUND OF THE INVENTION

1. Technical Field

The present invention relates in general to risk managing future events, and in particular, to insurance-funded end-of-lifetime activities for a facility.

2. Description of the Related Art

In the United States, there are approximately 950,000 existing oil and gas industry related wells currently being tracked and/or regulated by state and federal agencies. About 30,000 new wells are drilled each year on private, state, federal, and Indian lands onshore and in the bay, coastal and offshore waters of the United States.

Over time, a well's production rate declines as fluids (e.g., oil and gas) are removed from underground reservoirs via the commercial production/depletion process. When the daily expenses of production approach the daily value of the fluids produced, the continued production of the well becomes uneconomical. Because larger and more stable oil companies generally have higher operating costs, when it becomes uneconomical to produce a well, that well is often sold down the operator "food chain" to operators with lower operating expenses. Smaller operators with lower operating costs are typically better able to profitably produce the well into its last years of life. The vast majority of wells are therefore sold several times over their lives, with each successive or "legacy" owner/operator typically having less financial resources than the previous operator.

State and/or federal governmental regulatory agencies generally require wells that have been non-producing longer than a specified time period be plugged by the last operator. The process of plugging a well bore (also referred to as "plugging and abandonment" or "P&A") with cement or other material renders the well bore environmentally safe and incapable of acting as a conduit for commingling of subsurface formation fluids and/or the introduction of either subsurface or surface contaminates into fresh water underground aquifers. Because the financial burden of plugging a non-producing well is significant, many operators unfortunately choose to abandon non-producing wells without the required plugging. Wells having no clearly responsible party with the ability to perform the required plugging are referred to as "orphaned" wells. It therefore becomes the responsibility of the state, federal or Indian government to pay for the plugging and abandonment of these orphaned wells.

To mitigate the cost of plugging orphaned wells, most states have instituted a bonding program requiring well and facility operators, as a condition of state authorization to operate, to post financial assurance bonds naming the state as payee in case the operator fails to plug wells as required. Although operators can elect to "bond" wells by the foot of depth this option is chosen in relatively few instances such as when the operator has only a few wells together having aggregate footage depth such that the cost per foot is less than a blanket bond for the same number of individual wells. More typically operators elect a blanket bonding option wherein a fixed monetary amount covers multiple wells. In such instances the amount of money the state is able to collect from delinquent operators' blanket bonds typically averages far less than the actual cost incurred to plug the wells which are covered by the blanket bonding. Since it is less expensive than plugging their wells, unscrupulous operators often abandon wells and forfeit their bonds. This has led to thousands of wells being "dumped" to the states for plugging. The result is billions of dollars of plugging liability falling to states as thousands of wells are left unplugged, potentially contaminating subsurface fresh water sources needed for human and agricultural use. Additionally, entire parcels of surface land have been devalued due to the fact that the aforementioned "unscrupulous operators" were negligent in containing surface contamination of multiple well sites during operations prior to their "dumping" of said wells. This is a common and growing environmental problem facing governments and private land owners throughout North America.

Operators of oil and gas industry wells and the owners (private and public) of the land and royalty rights where wells and/or support facilities are located (including bay, coastal and offshore) are at significant economic risk from unplugged wells and improperly decommissioned/abandoned support facilities (e.g., offshore drilling and production platforms). Some operators feel at risk from a legacy operator failing to properly plug a well because there is a growing concern that state governments may begin to seek damages from "deep pocket" previous operators to help defray the state's rapidly growing plugging expenses. Land and royalty owners are at risk from surface and subsurface commingling of fluids despoiling the land for agriculture and other purposes and/or damaging underground reservoirs above the well production zone, rendering them significantly polluted and/or unusable. In addition, governmental entities are at financial risk as the financial burden of plugging orphaned wells continues to grow.

SUMMARY OF THE INVENTION

An insurance policy finds end-of-lifetime activities for a non-human facility at an end of a lifetime of the facility with a policy benefit whose amount is based upon growth of a premium.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

The present invention recognizes that many facilities, for example, well bores and associated support facilities, have limited useful lifetimes, which terminate in some known, relatively predictable, definable and quantifiable mandatory economic activity. For example, like a human being, an oil or natural gas well bore is "born" (drilled), lives a limited useful "life" (the period of production), and is generally required by statute to be "buried" (plugged) after it "dies" (ceases production for a specified period of time). Other facilities similarly having limited useful lifetimes that terminate in a relatively predictable, definable and quantifiable mandatory economic activity include, without limitation, $CO_2$, steam, geothermal, water, injection, monitoring, disposal, and exploratory well bores (whether on land or in bay or offshore waters); production, drilling, and service platforms associated with offshore oil and gas production; mining and processing facilities, including open pit and subsurface mines, waste and settling ponds, and other forms of ore enriching operations; hydrocarbon and chemical processing plants; wind driven energy producing facilities; above-ground and underground hydrocarbon storage systems; nuclear power plants and spent fuel processing or reprocessing facilities; municipal waste and other disposal sites; waste water treatment facilities; and any variety of special purpose tanks, buildings, rooms and enclosures (such as those used for biological agents manufacture, nuclear research laboratories and hazardous substances storage) that must eventually be dismantled, removed, disposed of or decommissioned. To some degree, all such facilities have the attendant risk that the owner and/or operator of the facility at the end of the limited useful lifetime of the facility will be unable or unwilling to perform end-of-lifetime activities that are statutorily, environmentally or otherwise desired or required.

In view of this recognition, the present invention further appreciates that a large market exists for a risk management process and insurance product that will mitigate or reduce the above mentioned risks and liabilities associated with the end of the useful life of a facility. The present invention therefore provides, in one embodiment, insurance-backed pre-funding of the known, relatively predictable, definable and quantifiable end-of-lifetime economic activity for a facility. In a preferred embodiment, the insurance vehicle employed to prefund the end end-of-lifetime economic activity is legally classified as a life insurance policy (i.e., a funding agreement) rather than a property and casualty (P&C) insurance policy. As will be appreciated, the use of life insurance instruments to prefund costs has previously been restricted (generally by statute) to insuring activities for which the triggering event is the end of a human life (e.g., pre-need human burial insurance.)

Figure 1:
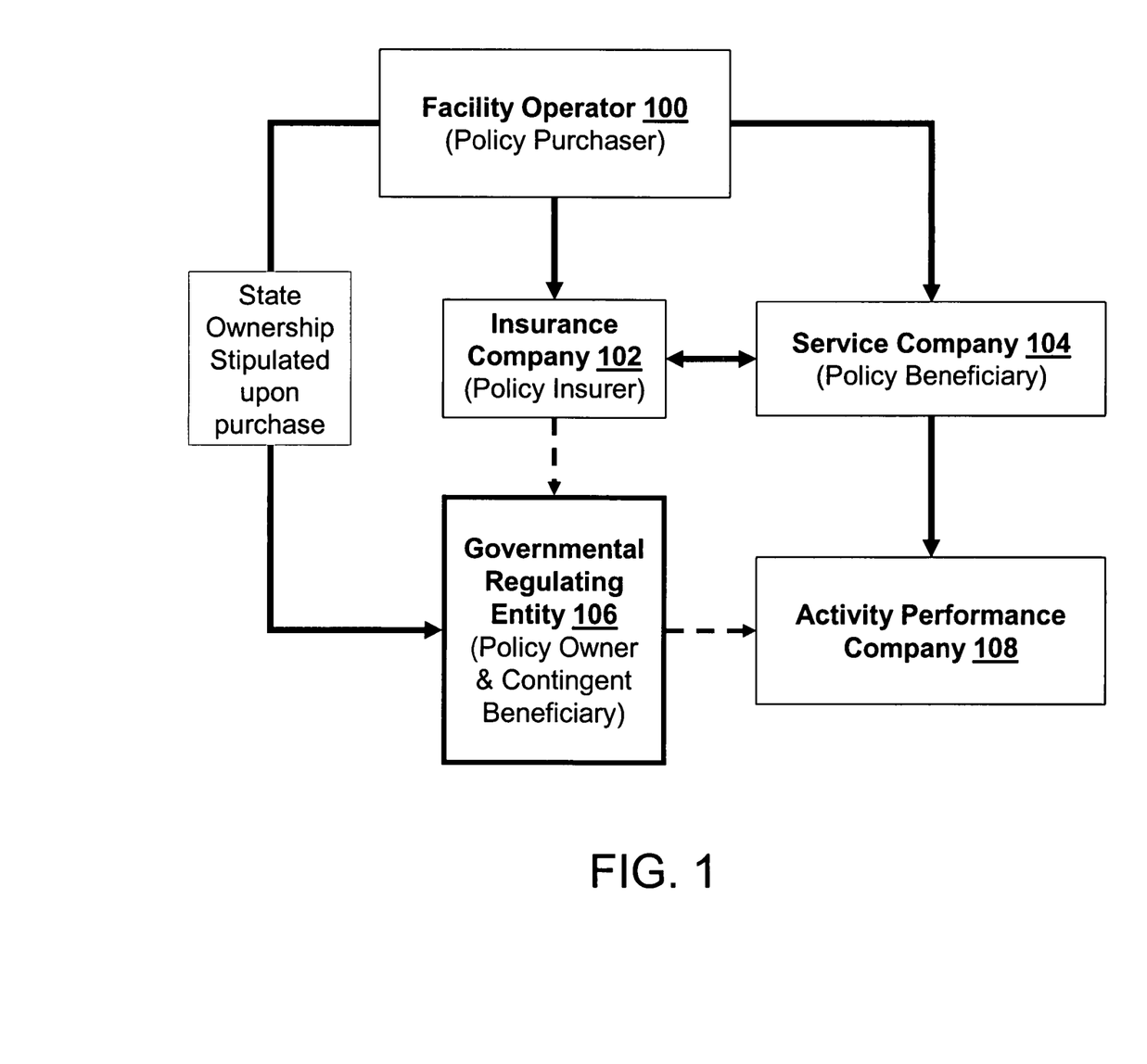
FIG. 1 is a conceptual diagram depicting the entities involved in risk managing end-of-lifetime activities for a facility.

With reference to the figures and in particular with reference to FIG. 1, there is illustrated a conceptual diagram depicting the governmental and business entities involved in risk managing end-of-lifetime activities for a facility in one embodiment of the present invention. In the depicted embodiment, a facility operator 100, which may also be the facility owner, purchases an insurance policy from insurance company 102 (the policy insurer) that prefunds end-of-lifetime activities for a non-human facility having a limited useful lifetime (of known or unknown duration). Purchase of the insurance policy may or may not be statutorily required by a governmental regulating entity 106 having statutory or regulatory authority over the facility in order for facility operator 100 to legally operate the facility.

The insurance policy preferably has a number of features. First, as noted above, the insurance policy is preferably a non-cancelable, non-surrenderable, long duration (i.e., multi-year) contract form of life insurance (rather than a property and casualty) instrument formally classified as a "funding agreement" typically used to pay for certain mandated activities at the end of a facility's lifetime. That is, as a life insurance instrument, the insurance policy is intended to provide funding in response to an occurrence of a triggering event (i.e., end of the useful lifetime of the facility) that is actuarially certain. In contrast, property and casualty policies are typically annually renewable contracts that can be cancelled by the insurance company when it feels the risk levels exceed its level of comfort and are intended to transfer the risk of the occurrence of an event or events that may or may not occur (e.g., fire, flood, or hail damage) and when/if they do occur the frequency of such occurrences and the magnitude of the associated costs per incident are relatively unpredictable.

Second, the insurance policy is prepaid by the facility operator 100 in advance of need ("pre-need"). Insurance company 102 may require facility operator 100 to purchase the insurance policy with a single upfront pre-payment or, alternatively, can utilize well known securitization methods to enable facility operator 100 to make multiple premium payments in lieu of a single upfront pre-payment.

Third, the insurance policy is preferably non-cancelable by the insurance company, non-surrenderable by the purchaser, transferable with the facility, and facility-specific. Thus, once the insurance policy is bound to a facility, the insurance policy cannot be revoked and remains bound to the facility for the duration of the facility's lifetime, despite changes in ownership or operatorship of the facility.

Fourth, facility operator 100, although the policy purchaser, is not the beneficiary of the insurance policy. Instead, the policy beneficiary is preferably a service company 104 that contracts with facility operator 100 to pay for the actual (future) cost of the end-of-lifetime activities for the facility in exchange for being named the primary beneficiary under the insurance policy. Service company 104, in exchange for being named primary beneficiary, takes advantage of the law of large numbers in that they assume economic risk by speculating that by properly and adequately specifying an acceptable benefit schedule at the time of policy sale the cost of the specified end-of-lifetime activities for the facility will, on the average, be less than the benefits to be received (i.e. some wells will naturally cost more to plug than the policy benefits to be received and some will cost less). Service company 104 may itself perform the end-of-lifetime activities specified by the insurance policy, or additionally or alternatively, serve as a "general contractor" negotiating with one or more activity performance companies 108 ("sub-contractors") to perform the specified activities. It will be appreciated that although insurance company 102, service company 104 and activity performance company 108 are separately illustrated, one or more of these business entities may be commonly owned and operated.

Fifth, an additional entity separate from the facility operator and the service company is preferably designated as the policy owner and contingent beneficiary. This additional entity is preferably perpetual in duration and not subject to state or federal taxation. In a particularly preferred embodiment, the state (whether the U.S. federal government, a state government, an Indian nation or a governmental regulating agency 106), as a perpetual entity with vested interest in each specified facility, is preferably designated as the policy owner and contingent beneficiary of the insurance policy. As the policy owner, this additional entity can change the designation of the policy beneficiary from service company 104 to another governmental, quasi-governmental, business, or non-profit entity. As contingent beneficiary, the this additional entity will receive the policy benefits from insurance company 102 if for any reason the primary beneficiary (e.g., service company 104) cannot perform its contractual duties to perform the end-of-lifetime activities for the facility.

Figure 2:
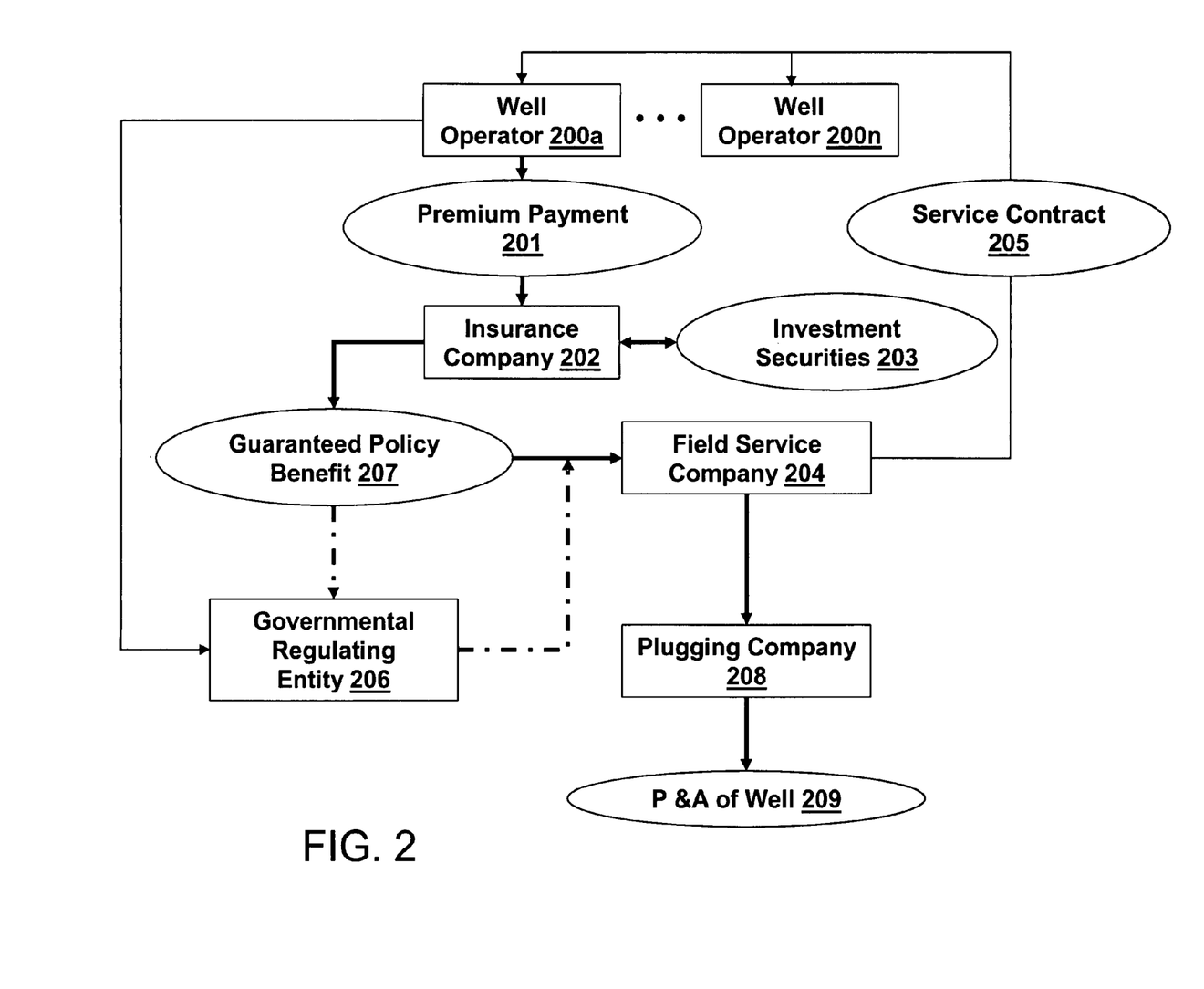
FIG. 2 is a conceptual diagram depicting the entities involved in risk managing end-of-lifetime activities for a well bore.

Referring now to FIG. 2, there is depicted a conceptual diagram depicting the governmental and business entities involved in risk managing end-of-lifetime activities for a well bore in accordance with the embodiment of the invention depicted in FIG. 1. As shown, a well operator 200a makes a premium payment 201 to an insurance company 202 to purchase a type of life insurance policy that prefunds specified end-of-lifetime activities for the well bore, which activities include the plugging and abandonment (P & A) of the well bore as required by applicable statute or regulation. As described above, the insurance policy is preferably non-cancelable, non-surrenderable and well-specific (i.e., the policy is attached to and therefore a permanent asset of the well bore itself), and names a field service company 204 as the primary beneficiary and an additional entity (such as the U.S. federal government, a state government, an Indian nation or a governmental regulating agency 206) as the policy owner and contingent beneficiary. In exchange for being named the primary beneficiary of the insurance policy, field service company 204 establishes a unilateral service contract 205 guaranteeing to pay all costs needed to provide the future service of plugging the well bore. A copy of this service contract is provided to the purchasing well operator 200a and remains binding and valid for all operators of record 200a-200n for the subject well. The purchase of the insurance policy is preferably recognized by the relevant governmental regulating entity 206 having statutory or regulatory authority over the well bore as an enduring supplemental or alternative proof of financial strength of well operators 200a-200n in addition to or in lieu of conventional per-well or blanket bonding, lines of credit or cash.

Because the financial value of the well bore declines over time and the financial strength of the well operators 200a-200n tend to also decline over the life of the well, the purchase of the insurance policy, whether for a new well or an existing well, tends to be at the time of greatest availability of finds for the current and future well operators 200a-200n and any working interest partners. Well operator 200a is incentivized to purchase the insurance policy, not only to meet the financial strength requirements imposed by government al regulating entity 206, but also to insulate well operator 200a from future liability for the plugging and abandonment of the well bore (which may otherwise be present regardless of whether well operator 200a continues to own or operate the well bore). Advantageously, the policy premium may also be tax deductible as an intangible drilling cost for a new well or as a lease operating expense for an active well.

Insurance company 202, through the purchase of investment securities 203, holds and safely grows premium payment 201 at some guaranteed rate of return (e.g., 2%-3% per annum) stipulated by field service company 204 in the underwriting process. In this regard, insurance company 202 functions much like a bank that guarantees repayment of the purchase price of a certificate of deposit (CD) plus interest at a fixed rate of return as a guaranteed policy benefit 207. However, in the case of insurance company 202, the policy benefits of the insurance policy are payable only to a named primary or contingent beneficiary, preferably after the contracted activity (plugging) has been completed in accordance with applicable regulations of governmental regulating entity 206 then in effect. It should be noted that the guaranteed policy benefit 207 paid by insurance company 202 is preferably determined according to a fixed schedule and thus is not a function of well, lease, or field productivity or the actual incurred cost to plug and abandon the specified well bore.

At the end of the useful lifetime of the well bore as determined, for example, by the governmental regulating entity 206 and/or the current well operator 200n (which may or may not be the same well operator 200a that originally purchased the insurance policy), authorization to plug the well bore is generally obtained from governmental regulating entity 206. For example, the current well operator 200n may request field service company 204 to begin closure services in accordance with service contract 205. In response, field service company 204 verifies the request and, in turn, requests authorization (either directly or through a plugging company 208) from governmental regulating entity 206 to perform a P & A on the specified well bore. Once regulatory agency documentation authorizing P & A is received, field service company 204 arranges for and pays all costs associated with plugging the specified well bore in accordance with the regulations of governmental regulating entity 206 then in effect, as shown at reference numeral 209. As noted above, field service company 204 may itself perform the required plugging or may alternatively subcontract with a separate plugging company 208 to plug the specified well bore.

After the plugging is completed field service company 204 obtains from governmental regulating entity 206 official verification and/or certification that the completed plugging work meets required regulatory standards (i.e., that the well bore is declared "closed" by the state), field service company 204 presents a benefits claim form (which may include the official verification mentioned above) to insurance company 202, which then validates the benefits claim and certifications received from field service company 204 to ensure that all work to plug the well bore has been completed. After validating the submitted claim, insurance company 202 issues the beneficiary payment to field service company 204 in accordance with the insurance policy provisions (i.e., the initial premium grown at the guaranteed rate over the policy life) and closes the policy.

Although it is preferred for field service company 204 to receive guaranteed policy benefit 207 only after plugging of the well bore has been completed by field service company 204 and/or plugging company 208 and certified by governmental regulating entity 206, insurance company 202 may alternatively provide guaranteed policy benefit 207 to the state (e.g., governmental regulating entity 206) or its designee (e.g., another service company or plugging company 208) prior to, during or after completion of plugging the well bore. This alternative benefit arrangement may arise, for example, because governmental regulating entity 206 exercised it prerogative as policy owner to change the primary beneficiary of the insurance policy to itself or another service company, because field service company 204 ceases operations or is otherwise unable to perform under service contract 205, or because of an alternative benefits payment provision in the insurance policy.

Figure 3:
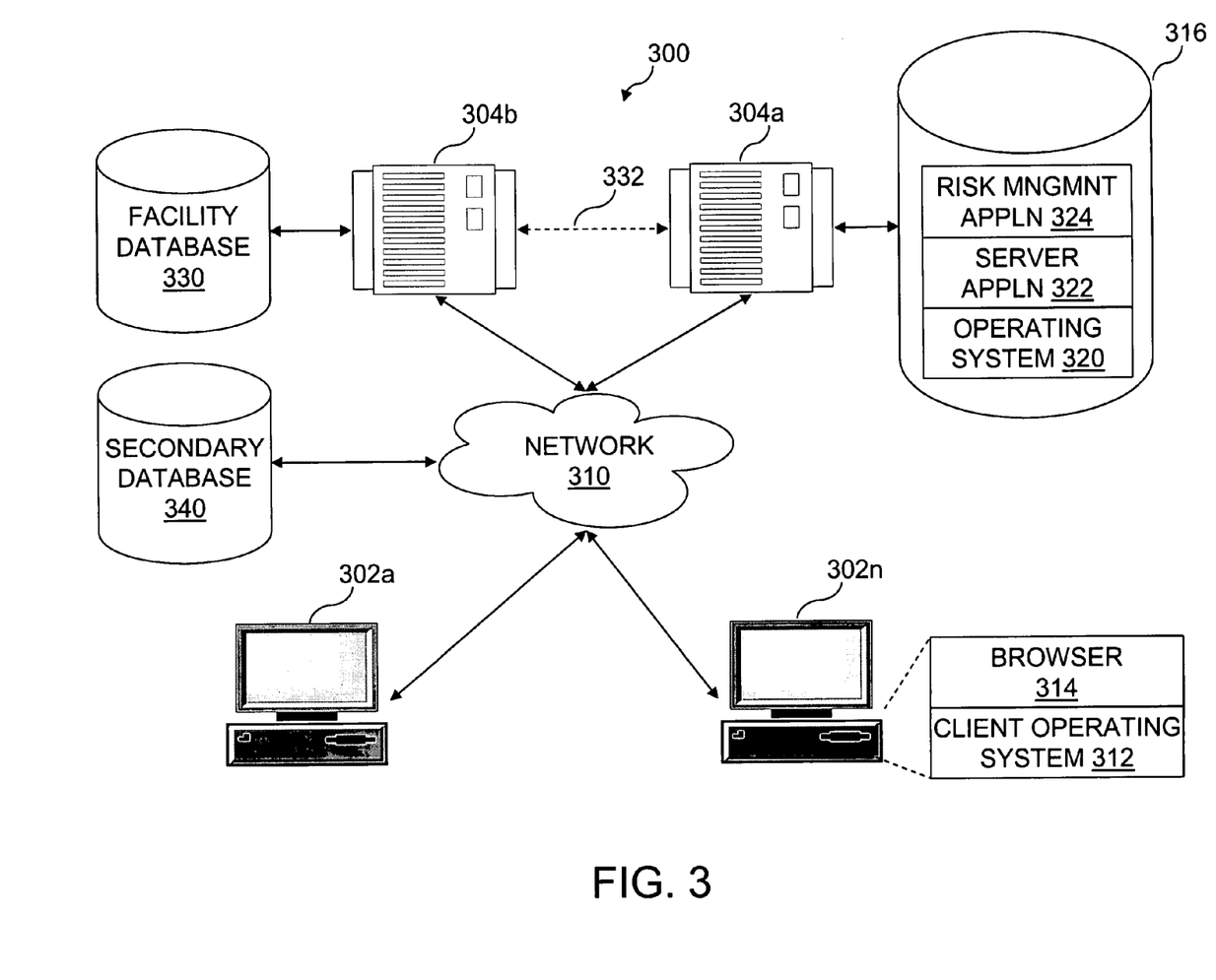
FIG. 3 is a block diagram of a network environment that may be employed to facilitate risk management of facilities in one embodiment of the present invention.

With reference now to FIG. 3, there is depicted a high level diagram of an exemplary network environment 300 in which the present invention may be practiced. As depicted, network environment 300 includes one or more client devices 302a-

302n in communication with one or more server systems 304a-304b via a network 310, which may comprise one or more wired or wireless, packet or circuit switched communication networks. Network 310 may include, for example, one or more local area networks (LANs) or wide area networks (WANs), such as the Internet.

As shown, each client device 302, which may be, for example, a personal computer system, laptop computer, personal digital assistant, web-enabled mobile communication device or the like, includes a client operating system 312 that provides a software operating environment for client device 302 and a browser 314 that provides an interface (e.g., a graphical user interface (GUI)) through which a user of client device 302 may communicate with one or more of server systems 304 via network 310. For example, in some embodiments, browser 314 may comprise Internet Explorer, available from Microsoft Corporation of Redmond, Wash. Browser 314 and client operating system 312 are preferably stored in non-volatile storage, such as a flash memory, hard disk drive, or optical drive, communicatively coupled to client device 302.

Server system 304a includes or is communicatively coupled to a non-volatile storage device 316 to execute and/or process program code stored therein. The program code stored within non-volatile storage device 316 includes an operating system 320 that provides a software operating environment for server system 304a, a server application 322 (e.g., a web server) that supports communication with browser 314 via network 310, and a risk management application 324 that, in one embodiment of the present invention, automates the acquisition of risk management insurance, as described further below. As will be appreciated by those skilled in the art, risk management application 324 includes instructions that may be executed or processed by server system 304a, and may further include program data.

Server system 304a is further coupled for communication to a facility database 330 that provides information regarding and/or related to facilities (e.g., well bores) that are or may be subject to underwriting. Server system 304a may be coupled to facility database 330 directly, or alternatively, via another server system 304b coupled to server system 304a by network 310 and/or a private network 332. A server system 304b separate from server system 304a may be utilized to host facility database 330 for a number of reasons, including data security, load balancing, or because facility database 330 is owned and/or operated by a different business or governmental entity than server system 304b. By way of example rather than limitation, a business entity may, for a cost, provide information within facility database 330 to other business entities, such as an insurance company 102 or service company 104 that causes server system 304a to process risk management application 324. Information regarding and/or related to the facilities that may be underwritten by an insurance company may optionally further be obtained by a server system 304a, 304b via network 310 from a secondary database 340 provided by a governmental regulating entity or a private entity. The information within secondary database 340 may duplicate or supplement some or all of the information contained within facility database 330.

In operation, a user stationed at a client system 302 invokes the execution of browser 314 to enable communication with server application 322 and risk management application 324 on server system 304a via network 310. Through this communication, a user stationed at client system 302 is able to insure a facility in an at least partially automated fashion, and in at least some embodiments, a fully automated fashion.

Figure 4A:
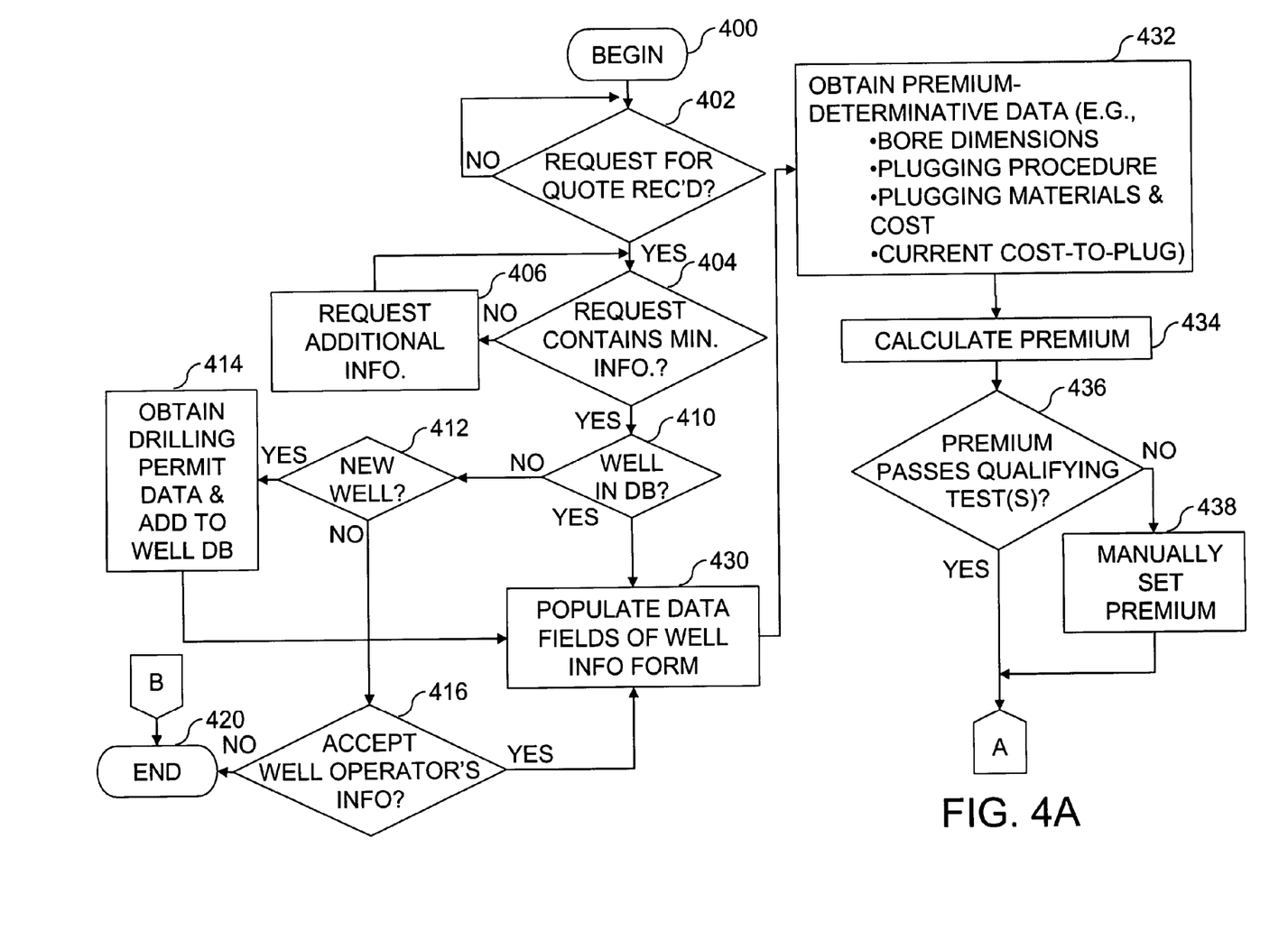
FIGS. 4A-4B together form a high level logical flowchart of an exemplary method of risk managing end-of-lifetime activities for a facility, such as a well bore, in accordance with one embodiment of the present invention.
Figure 4B:
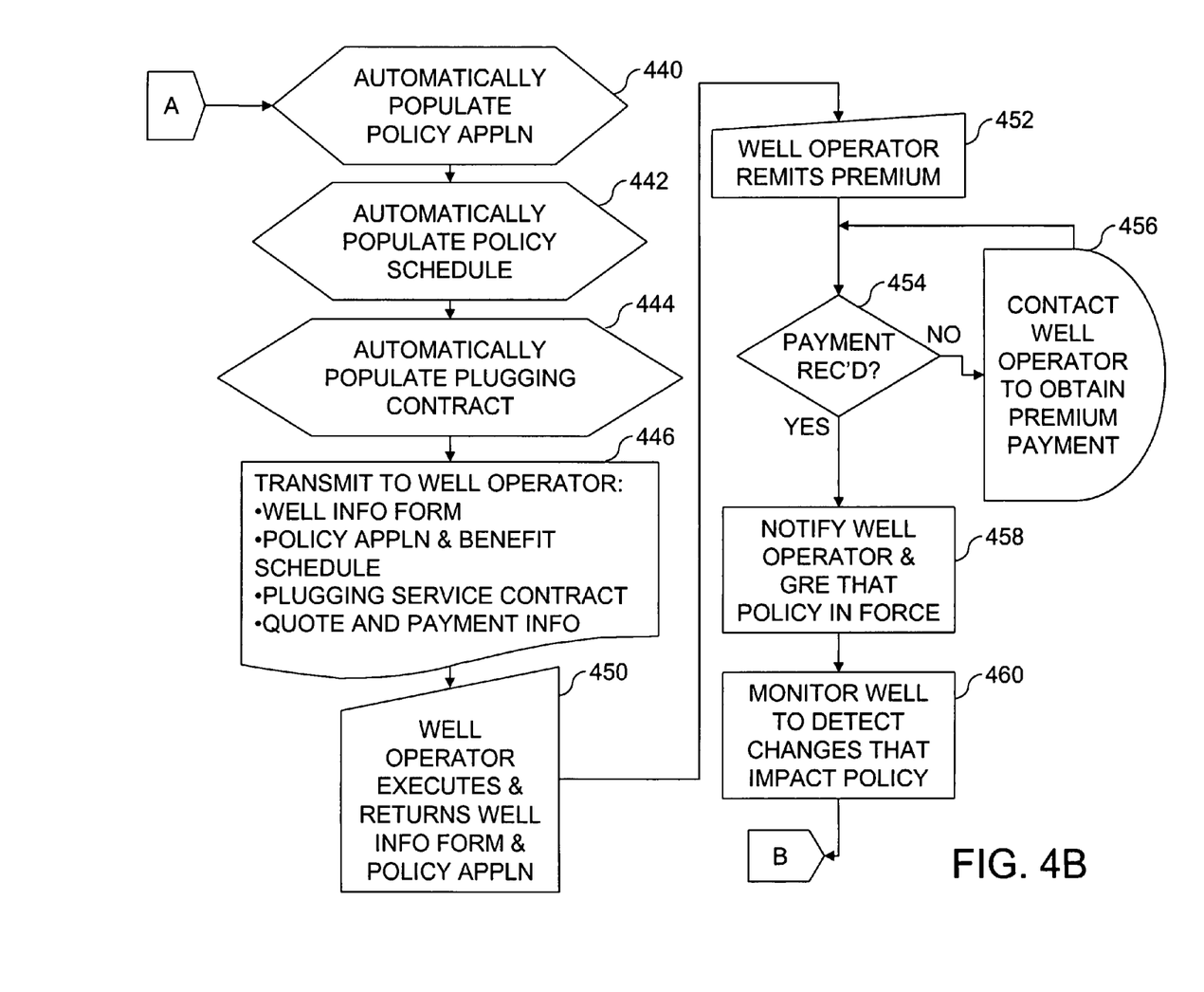

Referring now to FIGS. 4A-4B, there is depicted a high level logical flowchart of an at least partially automated process of risk managing and insuring a facility in accordance with one embodiment of the present invention. As a logical flowchart, it should be understood that at least some of the illustrated steps may be performed concurrently or in a different order than illustrated. In order to promote understanding of the present invention, the flowchart depicted in FIGS. 4A-4B is specifically described with reference to insuring and risk managing a well bore in accordance with the arrangement depicted in FIG. 2 and utilizing the network environment 300 of FIG. 3. This description is merely exemplary of the present invention and should not be construed in a limiting sense.

The process begins at block 400 with a server system 304a, which is operated by or at the behest of field service company 204 and/or insurance company 202, executing or processing risk management application 324 to provide a risk managing service, in part through data communication with client devices 302a-302n. The process proceeds from block 400 to block 402, which illustrates risk management application 324 determining whether it has received from a client device 302 a request for a quote for the amount of a premium payment of an insurance policy that prefunds end-of-lifetime plugging activities for a well bore. For example, a user of client device 302, which may be a representative of well operator 200a or an agent of insurance company 202 or field service company 204, may submit a request for a quote to risk management application 324 by utilizing browser 314 to navigate to an Internet website hosted by server application 322 and then responding to the information requests contained in one or more web pages served by server application 322.

If risk management application 324 has not received a request for a quote, the process iterates at block 402 until a request for a quote is received from a client device 302. In response to determining at block 402 that a request for a quote has been received, risk management application 324 determines at block 404 whether or not the request for quote includes a minimum amount of identifying information regarding the well bore. For example, the minimum identifying information may include the well operator identifier assigned by governmental regulating entity 206 to well operator 200a and a well identifier, which may be presented to the user, for example, in a pick list that is automatically populated by risk management application 324 from facility database 330 and/or secondary database 340 in response to entry of the well operator identifier. If risk management application 324 determines at block 404 that the request for quote does not contain sufficient identifying information for a quote to be developed, risk management application 324 preferably prompts the user of client device 302 for more information, as indicated by the process iterating at block 404, until sufficient identifying information is obtained.

Once sufficient identifying information is obtained, risk management application 324 attempts to locate descriptive information regarding the specified well within facility database 330, as illustrated at block 410. If descriptive information regarding the specified well is located within facility database 330, the process proceeds to block 430, which illustrates risk management application 324 automatically populating data fields of a well information form with descriptive information regarding the well from facility database 330. These data fields may include, for example, the well's geographic location and age, as well as well configuration information such as well bore depth, bore size, casing size, and the number and location of producing zones.

If risk management application 324 does not find descriptive information regarding the specified well in facility database 330 at block 410, the process proceeds to block 412, which depicts risk management application 324 determining if the reason that descriptive information regarding the well is not contained within facility database 330 is that the well is a new well that has yet to be drilled or has only recently been drilled. Risk management application 324 may make this determination, for example, by reference to the specified well identifier. In response to determining at block 412 that the well is a new well, risk management application 324 obtains descriptive information regarding the well from an official well information form (e.g., The Texas Railroad Commission well Forms W-2 for oil wells or G-1 for gas wells) or other information within secondary database 340 (e.g., the Texas Railroad Commission database or a privately-maintained database such as DrillingInfo, Lasser, Petroleum Information, or Petro Data Source). Risk management application 324 uses the information to populate facility database 330 with descriptive information regarding the well, as well as to fill the data fields of the well information form, as depicted at block 414 and 430.

Referring again to block 412, if risk management application 324 determines that the well is not omitted from facility database 330 because of the newness of the well, risk management application, either automatically or through the intervention of a human operator, determines at block 416 whether or not to accept descriptive information regarding the well from well operator 200a based upon, for example, the well operator identifier, the number of wells for this well operator 200a that are currently specified within insurance policies, and/or the reasonability of the entered data in absolute terms or with respect to comparative wells in geographic proximity or having similar horizons. In response to a negative determination at block 416, risk management application 324 denies the request for a quote (e.g., by causing server application 322 to transmit to client device 302 a web page denying the request for quote), and the process ends at block 420. In response to a positive determination at block 416, the process passes to block 430, which depicts risk management application 324 populating data fields of the well information form with well information provided by well operator 200a. The process then passes from block 430 to block 432.

Block 432 illustrates risk management application 324 obtaining various premium-determinative data utilized to determine premium payment 201. In one embodiment, risk management application 324 itself generates these premium-determinative data from the descriptive information for the well obtained from facility database 330, secondary database 340, and/or well operator 200a. In an alternative embodiment, risk management application 324 obtains the premium-determinative data from another source, such as server system 304b. In particular, in some embodiments, a server system, such as server system 304b, may be configured to provide the premium-determinative data to risk management application 324 or other requestors as a fee-based service.

As indicated, the premium-determinative data may include, for example, the dimensions of the well bore; the well casing configuration, the plugging procedure to be following given the well type, age, bore depth, number and location of producing zones, etc.; estimated time-and-materials cost of the plugging procedure; and the current cost-to-plug. The current cost-to-plug may be determined, for example, by reference to a historic plugging cost database (which may be maintained as a part of facility database 330 or secondary database 340) that provides recent historical costs to plug wells (e.g., average price per foot of total depth) by geographic region. Alternatively, the current cost-to-plug can be determined using the volumetric consumption data (e.g., the volume of cement required, the number of plugs required, the time required to place the plugs and cement, the number of pieces of field equipment such as pole or derrick work-over rigs, the number of workers to operate the equipment, etc.) extended by relevant cost data (e.g., cement cost per unit volume, worker hourly wage rates, service unit costs, and appropriate overhead and administrative costs plus customary profit margins) generated from the state-mandated well plugging procedure documentation.

Based upon the premium-determinative well data, risk management application 324 then calculates the amount of premium payment 201, as illustrated at block 434. For example, in one embodiment, risk management application 324 may calculate the amount of premium payment 201 by separately computing cost components for each of field service company 204 and insurance company 202. Assuming that the growth of premium guaranteed by insurance company 202 is sufficient to cover projected increases in plugging costs, the cost component for field service company 204 may be computed, for example, by adding the current cost-to-plug, a profit margin for the field service company 204, and optionally, a risk adjustment based upon the age of the well bore and/or the estimated time-to-plugging. The risk adjustment may account, for example, for additional plugging costs that may be incurred as a result of well bore deterioration (e.g., casing corrosion). As will be appreciated, if field service company 204 can contract to perform end-of-lifetime activities for a sufficiently large number of facilities (e.g., well bores), the cost component for field service company 204 need not be set sufficiently high to guarantee that field service company 204 will never lose money in funding end-of-lifetime activities for a facility. Instead, by leveraging actuarial analysis of a sufficiently large data set, field service company 204 may set its cost component so that it achieves a desired (or market-supported) profit margin on the average. The cost component for insurance company 202 may be computed by risk management application 324 by summing a trend factor, a risk margin, an expense margin (e.g., for administrative costs and commissions), and a profit margin. The sum of these two cost components would then equal the amount of premium payment 201.

It should be noted that although the determination of the amount of premium payment 201 can be based upon additional factors, such as a well's (or field's) net production value profile or an estimated insurance premium payment curve, production estimates and estimated premium payment curves are preferably not considered. In addition, although the amount of premium payment 201 is preferably determined on a per-well basis, assuming enough policies are underwritten in a given geographic area, the beneficiary field service company 202 will be able to aggregate wells to be plugged in a common geographic area over some period of time (e.g., the multi-year period following cessation of production as specified by some governmental regulating entities 206 in which plugging must to be performed) to negotiate a "volume discount" in price from a plugging company 208 at the time plugging is needed. Thus, some of the risk to field service company 204 associated with correctly projecting the growth rate of plugging costs is mitigated by its expected negotiating power at the time of plugging.

Next, as illustrated at block 436, risk management application 324 determines whether or not the amount of premium computed at block 434 passes one or more qualifying tests. For example, one qualifying test may be to ensure that the cost-to-plug the well based upon its total depth and the historical average price per foot of total depth in the well's geographic region is greater than the time-and-materials cost of plugging the well. A second qualifying test that may be applied is to ensure that the total depth of the well bore is less than a threshold depth and that the number of producing zones is less than a threshold number. If the amount of premium fails any of the qualifying test(s), as represented in FIG. 4A by the process passing to block 438, risk management application 324 preferably halts automated processing of the request for quote and flags the request for quote for manual review, for example, by making an entry in a database within non-volatile storage 316 and/or transmitting an email identifying the request for quote to a representative of field service company 204 and/or insurance company 202. In response to risk management application 324 flagging the request for quote, the representative evaluates the request for quote and either denies the request for quote or, more preferably, manually computes a premium amount and transmits (e.g., from a client device 302) the premium amount to risk management application 324, which is then able to resume automated processing of the request for quote.

Once the premium amount passes the qualifying tests at block 436 or is manually set at block 438, the process proceeds through page connector A to blocks 440-444 of FIG. 4B. Blocks 440-444 represent risk management application 324 automatically generating an executable insurance policy application, a policy schedule of benefits, and a plugging service contract 205 by populating data fields within corresponding preexisting form documents (e.g., stored as program data within non-volatile storage device 316) with information specific to the well to be specified in the insurance policy. As described above, the insurance policy is preferably non-cancelable, non-surrenderable and well-specific (i.e., the policy is attached to and therefore a permanent asset of the well bore itself), and names field service company 204 as the primary beneficiary and the state (whether the U.S. federal government, a state government or a governmental regulating agency 206) as the policy owner and contingent beneficiary. The policy preferably further specifies an upfront, paid up premium, and the policy schedule of benefits preferably sets forth a fixed schedule of benefits that is not a function of the actual future cost incurred to plug and abandon the well and that specifies a guaranteed policy benefit that will not be paid until the well is officially recognized by the state (e.g., governmental regulating entity 206) as being properly plugged. The plugging contract preferably unilaterally obligates field service company 204 to pay all costs associated with plugging the specified well in accordance with the requirements of governmental regulating entity 206 in exchange for being named primary beneficiary under the insurance policy. The insurance policy, schedule of policy benefits, and plugging contract each preferably employs a unified multi-state format approved or legally sufficient for use in multiple states but may have and/or generate formats unique to each state.

Following block 444, the process passes to blocks 446-460. Each of the steps represented by blocks 446-460 may be performed entirely manually by humans, or advantageously, at least partially through electronic means. As shown at block 446, the well information form generated at block 430, the policy application and policy benefit schedule generated at block 440-442, and the plugging service contract 205 generated at block 444 are archived in non-volatile storage device 316 and transmitted to well operator 200*a* together with a quote form indicating the amount of premium payment 201 and information regarding acceptable methods of payment (e.g., electronic funds transfer (EFT) or check). This transmission can be performed, for example, by risk management application 324 through an HTML or email transmission to a client device 302 via network 310, or alternatively, by conventional physical mail, courier service, or facsimile.

In response to receipt of the quote package (consisting, for example, of a cover letter describing the contents and actions required by the operator, a formal quotation of the premium amount for the subject well bore, a well bore information verification form, an insurance policy application form, and specific detailed directions for proper premium remittance procedures) transmitted at block 446, well operator signs the well bore information verification form to signify accuracy of the underwriting data upon which the premium for the specified well is based, and attendant conditions, and also signs the insurance policy application form indicating agreement to purchase the subject policy for the specified well for the premium amount stipulated in the formal quotation form, returning to a representative of the field service company the signed forms and simultaneously remits the premium in accordance with the directions for doing so. In response to receipt of the quote package transmitted at block 446, well operator 200*a* executes and returns to a representative of field service company 204 the well information form in order to signify accuracy of the underwriting data upon which the premium for the specified well is based, and attendant conditions, and an obligation to remit premium payment 201 (block 450). Well operator 200*a* can execute and return the well information form and insurance policy application, for example, by entering a digital signature directly into an HTML page served by risk management application 324 and server application 322 of server system 304*a*. Alternatively, well operator 200*a* may digitally or physically sign the well information form and insurance policy application and return them by email to risk management application 324. Of course, well operator 200*a* may alternatively physically sign the well information form and insurance policy application and return them by physical mail, courier or facsimile.

In addition, as shown at block 452, well operator 200*a* remits premium payment 201 to insurance company 202 in accordance with the executed insurance application. For example, well operator 200*a* may remit payment by EFT payment either independently of communication with server system 304*a* or through an EFT web page served by server application 322 (which may then automatically initiate the electronic funds transfer). Alternatively, premium payment 201 may be made by physical check. As indicated by a negative determination at block 454, if payment is not received for a period of time or if an attempted payment fails (e.g., incorrect EFT information is provided or a check is returned for insufficient funds), well operator 200*a* is contacted to arrange remittance of premium payment 201. For example, risk management application 324 may cause server application 344 to serve an HTML payment error page to a client device 302 or may transmit an email to client device 302. Alternatively or additionally, a human representative of insurance company 202 and/or field service company 204 may contact well operator 200*a*.

Once premium payment 201 is received by insurance company 202, as indicated by a positive determination at block 454, well operator 200*a* and governmental regulating entity 206 are notified that the insurance policy is in force, as depicted at block 458. For example, risk management application 324 may cause server application 344 to serve an HTML "payment received" page to a client device 302 and/or may transmit an email notification indicating that the policy is in force to a client device 302 or a designated receiving email address of governmental regulating entity 206. Alternatively or additionally, notice may be provided by physical mail, courier or facsimile.

After the insurance policy is in force, field service company 204 and/or insurance company 202 regularly (e.g., monthly) monitors secondary database 340 for any changes in conditions affecting the specified well bore that impact the underwriting assumptions (block 460). This monitoring may be performed manually by a human operator or in automated fashion by risk managing application 324 accessing secondary database 340 via network 310 to obtain statistics on wells, automatically comparing the downloaded statistics to corresponding information within archived well information forms of policy-specified wells, and then flagging (e.g., by a database entry or email) any significant discrepancies (e.g., well deepening, a plug back/re-complete procedure, etc). Because such modifications to the well bore can affect the future plugging and abandonment cost, field service company 204 may provide notice to the current well operator 300n and to governmental regulating entity 206 that a policy addendum or additional insurance policy is required in view of the changed characteristics of the modified well bore. Following block 460, the process passes through page connector B and terminates at block 420 of FIG. 4A.

As has been described, the present invention supports managing and reducing the environmental and/or financial risks associated with end-of-lifetime activities for a non-human facility by prefunding those activities with a life insurance instrument. The life insurance instrument is preferably transferable with the facility ownership/operatorship, non-cancelable by the insurance company and non-surrenderable by the purchaser or owner. The insurance policy preferably names as owner and contingent beneficiary an entity separate from the policy purchaser (e.g., a perpetual governmental entity having vested interest in the proper performance of end-of-lifetime activities (e.g., plugging, decommissioning, and/or environmental remediation) for the facility). The insurance policy preferably further names as primary beneficiary a company that agrees to fund the end-of-lifetime activities for the facility, regardless of actual future costs, in exchange for receipt of the policy benefits. Thus, the future cost associated with the end-of-lifetime activities for the facility may be fixed at a known present day amount that is prefunded by the (preferably) upfront premium payment of the life insurance instrument.

One advantage of the innovative insurance arrangement disclosed herein is that the inherent risk associated with the ownership/operatorship transfer of facilities is reduced by creating an enduring asset of known value attached to the facility that automatically survives ownership transfer of the facility to subsequent operators and for which operator 200a may be reimbursed for the policy premium as part of the price paid by legacy operator 200n for ownership of the well bore and associated assets.

Another advantage of the innovative insurance arrangement disclosed herein is that it protects the environment by reducing the financial incentive of the terminal operator 200n for the abandonment of a facility without performance of needed and/or required end-of-lifetime activities.

Yet another advantage of the innovative insurance arrangement disclosed herein is that the financial risk to governmental entities that they may be required to fund the end-of-activities for a facility is reduced or eliminated completely.

Still another advantage of the innovative insurance arrangement disclosed herein is that it is capable of providing continuing insurance protection over extremely long time periods (e.g., over 100 years) that are well beyond the duration of conventional insurance policies (e.g., property and causality insurance policies) typically used to protect non-human entities.

Yet another advantage of the innovative insurance arrangement disclosed herein is that it provides a "fail safe" in that, by making a perpetual, tax exempt governmental entity the policy owner and contingent beneficiary, the policy benefits can be used by the governmental entity to fund and/or perform the end-of-lifetime activities for the facility should the primary beneficiary service company be unable to fund and/or perform the end-of-lifetime activities.

Another advantage of the innovative insurance arrangement disclosed herein is that it minimizes the corporate state and federal income taxes paid on the growth of the premium over the life of a specified facility to maximize the net growth of premium and/or insurance company profits, promoting insurance company stability, viability, and profitability over the possibly extended lifetime of the specified facility.

Still another advantage of the innovative insurance arrangement disclosed herein is that it allows the operator of a policy-specified facility to remove the associated liability for the end-of-lifetime activities from the operator's balance sheet, facilitating the acquisition of added capital for business operations. In addition, the innovative insurance arrangement disclosed herein facilitates the acquisition of funding in the form of a collateralized loan to purchase and transfer ownership of the facility using the facility as collateral inasmuch as a facility specified by such a "burial policy" will not unexpectedly become a liability when the end-of-lifetime of the facility is reached. Otherwise, in the event of foreclosure by the lending entity, the use of the facility as collateral may well place the lender in the position of having to find end-of-lifetime activities for the facility finding that the well bore(s) used as collateral for the loan has transformed into a liability thus compounding the lender's potential losses.

Yet another advantage of the present invention is that it provides a "locked in" or "fixed" price coupled with a "turn-key" solution to the significant and growing problem of funding end-of-lifetime activities for facilities in that, once a policy specifying a facility is purchased, the end-of-lifetime activities for the facility are certain to be performed with the operator having no obligations beyond paying the initial "locked in" premium amount. Advantageously, the present invention leverages a known financial instrument (i.e., a funding agreement) to fund the end-of-lifetime activities, while establishing an entirely new market for this form of life insurance. The present invention further insures against some previously uninsurable risks, for example, the liability of previous facility owner and/or operators due to the failure to perform of legacy owners and/or operators.

As applied to the plugging and abandonment of oil and gas industry well bores and/or the decommissioning of associated support facilities, the innovative insurance arrangement disclosed herein permits the premium amount to be determined irrespective of the timing of the needed end-of-lifetime services, without requiring a knowledge of the hydrocarbon reservoir size or contents, without calculating the facility's productive life, and without knowledge of the net production value profile of a policy-specified well or any other well, and without the need to periodically adjust a premium payment curve based on discrepancies between the predicted and actual production profile.

In addition, the innovative insurance arrangement disclosed herein permits the premium payment to be classified as an allocable intangible drilling cost in the instance of a new well or an allocable lease operating expense in the instance of an active well, thus permitting a well operator to significantly reduce personal risk and expenses incurred by current state bonding systems requiring the operator to personally fund the required bonding by permitting the costs to be allocated among the non-operated working interest partners in a specified well.

Furthermore, numerous wells needing P & A activities in the same general time period can advantageously be aggregated in order to utilize volume discounts and economies of scale to reduce the total costs associated with the plugging and abandonment of oil and gas industry well bores and/or the decommissioning of associated support facilities.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a data processing system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of data processing in a data processing system, the method comprising:
   the data processing system issuing an insurance policy that is a funding contract providing, in exchange for a premium, a guaranteed fixed policy benefit without limitation of term to compensate for end-of-lifetime activities for a non-human facility at an end of a lifetime of the facility, wherein an amount of the fixed policy benefit is based upon an expected return on investment of the premium, and wherein the insurance policy designates, as primary beneficiary of the insurance policy, a service company, different from a policy purchaser, that agrees to fund the end-of-lifetime activities for the facility in exchange for being designated as primary beneficiary of the insurance policy;
   prior to issuing the insurance policy, the data processing system:
      receiving premium-determinative data regarding the facility; and
      automatically determining the premium based upon the premium-determinative data and independently of a production associated with the facility; and
   in conjunction with the insurance policy, the data processing system generating a service contract that obligates the service company to fund the end-of-lifetime activities in exchange for designation in the insurance policy as primary beneficiary of the insurance policy.

2. The method of claim 1, wherein:
   said premium is a fully paid upfront one-time premium; and
   said issuing comprises issuing said insurance policy in response to receipt of payment of the fully paid upfront one-time premium.

3. The method of claim 1, and further comprising:
   naming in the insurance policy an entity separate from a policy purchaser as owner of the insurance policy.

4. The method of claim 3, wherein said owner of the insurance policy is a governmental entity.

5. The method of claim 1 and further comprising:
   designating an entity separate from the policy purchaser as contingent beneficiary of the insurance policy.

6. The method of claim 1, wherein said insurance policy is non-cancelable by an issuing insurance company and non-surrenderable by a policy owner of said insurance policy.

7. The method of claim 1, wherein:
   said facility includes a well bore; and
   said end-of-lifetime activities include plugging the well bore.

8. The method of claim 1, and further comprising:
   in response to receipt of identifying information identifying the facility, the data processing system automatically obtaining the premium-determinative data regarding the facility.

9. The method of claim 8, and further comprising:
   the data processing system receiving said identifying information over a network from a remote client device.

10. The method of claim 1, and further comprising:
    the data processing system validating the premium with one or more qualifying tests; and
    in response to the premium automatically determined failing at least one qualifying test, the data processing system providing a notification that the premium is to be manually determined.

11. The method of claim 1, and further comprising:
    following determination of the premium, the data processing system automatically generating an insurance policy application specifying the premium.

12. The method of claim 11, and further comprising:
    the data processing system automatically receiving an electronic digital signature on the insurance policy application.

13. The method of claim 1, wherein said insurance policy comprises a life insurance policy.

14. A method of data processing in a data processing system, the method comprising:
    the data processing system issuing a life insurance policy that is a funding contract that, in exchange for a premium, compensates for end-of-lifetime activities for a non-human facility at an end of a lifetime of the facility with a fixed policy benefit, wherein an amount of the fixed policy benefit is based upon an expected return on investment of the premium;
    the data processing system designating an entity separate from a policy purchaser as owner and contingent beneficiary of the life insurance policy; and
    the data processing system designating, as primary beneficiary of the life insurance policy, a service company that agrees to fund the end-of-lifetime activities for the facility in exchange for being designated as primary beneficiary of the life insurance policy.

15. A method, comprising:
    in response to receipt by a computer of information regarding a facility, the computer determining an amount of a premium for issuing an insurance policy that is a funding contract that, in exchange for the premium, compensates for end-of-lifetime activities for a non-human facility at an end of a lifetime of the facility with a guaranteed fixed amount policy benefit payable without limitation of term to a third party beneficiary other than an owner of the insurance policy, wherein an amount of the fixed policy benefit is based upon an expected return on investment of the premium and the premium is independent of projected future production value of said facility.

16. The method of claim 15, and further comprising:
the computer automatically obtaining premium-determinative data;
wherein said step of determining the amount of the premium comprises said computer automatically determining the amount of the premium from the premium-determinative data.

17. The method of claim 16, wherein said premium-determinative data include a procedure for performing the end-of-lifetime activities for the facility.

18. The method of claim 16, wherein said premium determinative data include a materials cost to perform the end-of-lifetime activities.

19. The method of claim 15, and further comprising:
the computer receiving said information over a network from a remote client device.

20. The method of claim 15, and further comprising:
the computer validating the amount of the premium with one or more qualifying tests; and
in response to the amount of the premium failing at least one qualifying test, the computer providing a notification that the amount of the premium is to be manually determined.

21. The method of claim 20, wherein:
the facility includes a well bore;
the end-of-lifetime activities include plugging the well bore; and
the one or more qualifying tests include verifying that a cost-to-plug the well bore exceeds a time and materials cost to plug the well bore.

22. The method of claim 15, and further comprising:
the computer automatically generating an insurance policy application specifying the amount of the premium.

23. The method of claim 22, and further comprising:
the computer automatically receiving an electronic digital signature on the insurance policy application.

24. The method of claim 22, and further comprising:
the computer automatically generating a service contract in which the service company agrees to fund the end-of-lifetime activities for the facility in exchange for being designated as primary beneficiary of the insurance policy.

25. The method of claim 15, wherein the insurance policy comprises a life insurance policy.

26. A program product, comprising:
a data processing system readable storage medium; and
program code stored within the data processing system readable storage medium to cause a data processing system to perform:
in response to receipt of information regarding a facility, determining an amount of a premium for issuing an insurance policy that is a funding contract that, in exchange for the premium, compensates for end-of-lifetime activities for a non-human facility at an end of a lifetime of the facility with a guaranteed fixed amount policy benefit payable without limitation of term to a third party beneficiary other than an owner of the insurance policy, wherein an amount of the fixed policy benefit is based upon an expected turn on investment of the premium and the premium is independent of projected future production value of said facility.

27. The program product of claim 26, wherein:
the program code further causes the data processing system to perform automatically obtaining premium-determinative data;
determining the amount of the premium comprises automatically determining the amount of the premium from the premium-determinative data.

28. The program product of claim 27, wherein said premium-determinative data include a procedure for performing the end-of-lifetime activities for the facility.

29. The program product of claim 27, wherein said premium determinative data include a materials cost to perform the end-of-lifetime activities.

30. The program product of claim 26, wherein said program code further causes a data processing system to perform:
receiving said information over a network from a remote client device.

31. The program product of claim 26, wherein said program code further causes a data processing system to perform:
validating the amount of the premium with one or more qualifying tests; and
in response to the amount of the premium failing at least one qualifying test, flagging the facility for manual premium determination.

32. The program product of claim 31, wherein:
the facility includes a well bore;
the end-of-lifetime activities include plugging the well bore; and
the one or more qualifying tests include verifying that a cost-to-plug the well bore exceeds a time and materials cost to plug the well bore.

33. The program product of claim 26, wherein said program code further causes a data processing system to perform:
automatically generating an insurance policy application specifying the amount of the premium.

34. The program product of claim 33, wherein said program code further causes a data processing system to perform:
receiving an electronic digital signature on the insurance policy application.

35. The program product of claim 33, wherein said program code further causes a data processing system to perform:
generating a service contract in which a service company agrees to fund the end-of-lifetime activities for the facility in exchange for being designated as primary beneficiary of the life insurance policy.

36. The program product of claim 26, wherein the insurance policy comprises a life insurance policy.

37. A risk management system, comprising:
a data processing system;
a data storage medium coupled to the data processing system; and
program code within the data storage medium to cause the data processing system to perform:
in response to receipt of information regarding a facility, determining an amount of a premium for a issuing an insurance policy that is a funding contract that, in exchange for the premium, compensates for end-of-lifetime activities for a non-human facility at an end of a lifetime of the facility with a guaranteed fixed amount policy benefit payable without limitation of term to a third party beneficiary other than an owner of the insurance policy, wherein an amount of the fixed policy benefit is based upon an expected return on investment of the premium and the premium is independent of projected future production value of said facility.

* * * * *